United States Patent [19]

Yeakey et al.

[11] 3,925,389

[45] Dec. 9, 1975

[54] PREPARATION OF AMINOETHYLPIPERAZINES

[75] Inventors: Ernest Leon Yeakey; Thomas Howard Austin, both of Austin, Tex.

[73] Assignee: Jefferson Chemical Company, Inc., Houston, Tex.

[22] Filed: Nov. 15, 1973

[21] Appl. No.: 416,181

[52] U.S. Cl. ...... 260/268 SY; 260/2 N; 260/268 CN
[51] Int. Cl.² ........................................ C07D 295/12
[58] Field of Search ............... 260/268 SY, 268 CN

[56] References Cited
UNITED STATES PATENTS
3,733,325   5/1973   Yeakey .................... 260/268 SY

*Primary Examiner*—Donald G. Daus
*Assistant Examiner*—Jose Tovar
*Attorney, Agent, or Firm*—John R. Kirk, Jr.; James L. Bailey; Lee G. Meyer

[57] ABSTRACT

A direct process for continuously preparing aminoethylpiperazines in high yields is disclosed. A cyanomethylpiperazine compound is continuously hydrogenated in the presence of a highly active, stable hydrogenation catalyst which consists essentially of cobalt, copper and chromium metal oxides having about 50% to 80% cobalt, about 10% to 49% copper and about 1% to 10% chromium, based upon the total weight of the metals, at a temperature within the range of about 80°C. to about 150°C. and a pressure within the range of about 1,000 psig to 10,000 psig. The aminoethylpiperazine is then recovered from the hydrogenation reaction effluent in high yields.

6 Claims, No Drawings

PREPARATION OF AMINOETHYLPIPERAZINES

BACKGROUND OF THE INVENTION

The field of this invention relates to processes for producing aminoethylpiperazines.

Aminoethylpiperazines are known compounds and are primarily used as curing agents for epoxy resins and as urethane catalysts. Heretofore, these compounds have been produced commercially as by-products of processes for the manufacture of piperazine and ethylene amines. However, due to the increased market demand for these products it has become essential to develop a direct process for producing them independent of the production of other amine compounds.

DESCRIPTION OF THE PRIOR ART

The preparation of alpha amino nitriles by the amination of glycolonitrile (formaldehyde cyanhydrin) and-/or mixtures of aqueous formaldehyde and hydrogen cyanide is well-known. Moreover, processes for continuously hydrogenating certain alpha amino nitriles are known. For example, U.S. Pat. Nos. 2,429,876, 2,436,368, and 2,519,803 disclose processes for continuously hydrogenating aminoacetonitrile to ethylene diamine in the presence of solvents and diluents such as ammonia, straight-chained alcohols and water. The patents disclose that the hydrogenations are carried out in the presence of nickel alloy, copper chromite and nickel or cobalt hydrogenation catalysts which have been previously sintered, i.e., the catalysts have been reduced with hydrogen at a temperature between 250°C. and 450°C. prior to continuous hydrogenation of the aminoacetonitrile. U.S. Pat. No. 3,067,255 discloses an improvement for the production of ethylene diamine wherein hydroxy acetonitrile or the technical-grade products obtainable from aqueous formaldehyde and hydrocyanic acid is continuously passed over a hydrogenation catalyst together with excess ammonia and excess hydrogen at increased pressures and elevated temperatures. The ammonia and hydrogen components of the process are used at rates of about 20 to 100 moles of liquid ammonia and about 100 to 1,400 liters of hydrogen to one mole of hydroxyacetonitrile. The hydrogenation catalysts disclosed as useful in the process are metals from the oxides, hydroxides and carbonates of cobalt and nickel. The catalysts can be activated by addition of a metal from the sixth or seventh group of the Periodic System such as chromium oxides in amounts from 1 to 10% by weight of the cobalt or nickel employed. However, it is disclosed that the hydrogenation catalyst must be sintered or reduced in the presence of hydrogen at high temperatures prior to use in the continuous hydrogenation process.

There are no known processes for directly producing aminoethylpiperazines. As briefly mentioned hereinbefore, aminoethylpiperazines are conventionally produced as by-products in the manufacture of piperazine and ethylene amines. Piperazine is normally produced by the reductive amination of ethylene glycol over a hydrogenation-dehydrogenation catalyst, which is predominantly nickel, in the presence of hydrogen at elevated temperatures and pressures. However, we have discovered a direct process for continuously producing aminoethylpiperazines selectively in commercially feasible high yields from a piperazine compound by catalytically hydrogenating cyanomethylpiperazines over a highly active, stable hydrogenation catalyst which allows the use of moderate temperatures and pressures which does not degrade the sensitive cyanomethylpiperazines. The specific catalyst employed consists essentially of cobalt, copper and chromium metal oxides in specific amounts and it is not required that the catalyst be sintered or reduced in the presence of hydrogen and high temperatures prior to the hydrogenation of the cyanomethylpiperazines.

Accordingly, it is a primary object of the present invention to provide a direct process for preparing aminoethylpiperazines selectively from piperazine compounds in commercially acceptable high yields.

Another object of the invention is to provide a process for catalytically hydrogenating cyanomethylpiperazines continuously over a highly active, stable hydrogenation catalyst consisting essentially of specific amounts of cobalt, copper and chromium metals at moderate temperatures and pressures which do not degrade sensitive cyanomethylpiperazines.

Other objects and advantages, if not set forth particularly herein, will become readily apparent from a reading of the ensuing specification and claims.

SUMMARY OF THE INVENTION

The present invention relates to a direct process for continuously preparing aminoethylpiperazines selectively in high yields from piperazines which comprises continuously hydrogenating a cyanomethylpiperazine in the presence of an active, stable hydrogenation catalyst consisting essentially of the metal oxides of cobalt, copper and chromium in amounts of about 50% to about 80%, about 10% to about 49% copper and about 1% to about 10% chromium, based on the total weight of the metals, at a temperature within the range of about 80°C. to about 150°C. and a pressure within the range of about 1,000 psig to 10,000 psig. The aminoethylpiperazine is then recovered from the resulting hydrogenation reaction produce such as by distillation.

DESCRIPTION OF THE PREFERRED EMBODIMENTS

In accordance with this invention, aminoethylpiperazines are prepared by first mixing and reacting a piperazine compound with a mixture of aqueous formaldehyde and hydrogen cyanide or glycolonitrile to produce the cyanomethylpiperazines. Essentially, glycolonitrile is a phosphoric acid-stabilized 70% aqueous solution of formaldehyde and hydrogen cyanide and is more expensive commercially than the preparation of a mixture of aqueous formaldehyde and hydrogen cyanide. However, either may be employed for cyanomethylpiperazine production.

The piperazine compound can be piperazine or a carbon-substituted piperazine, substituted with 1 to 4 alkyl or aryl groups. When alkyl-substituted piperazines are utilized, it is preferred that the alkyl group have 1 to 12 carbon atoms. Preferred aryl-substituted piperazines are phenyl-substituted piperazines. Examples of preferred piperazine compounds, besides piperazine, include 2-ethylpiperazine, 2-phenylpiperazine, 2,5-dimethylpiperazine, 2-methylpiperazine, 2,6-dimethylpiperazine, 2,3,5,6-tetramethylpiperazine and 2-dodecylpiperazine.

The exothermic reaction is preferably performed by adding either the glycolonitrile or the aqueous formaldehyde-hydrogen cyanide mixture to the piperazine compound diluted in a suitable solvent at a rate sufficient to maintain the reaction temperature at about 30°–45°C. Preferred solvents are water, methanol, dioxane or straight-chain alcohols which are inert in the subsequent hydrogenation reaction.

The preferred amounts of piperazine compound:-glycolonitrile or aqueous formaldehyde-hydrogen cyanide mixture is dependent upon the desired aminoethylpiperazine compound to be produced. Experiments have shown that when the mole ratio of piperazine compound:glycolonitrile is maintained at or above 2:1, the yield of N-(cyanomethyl) piperazines is consistently above 90%, basis charged glycolonitrile. However, when the mole ratio of piperazine compound:-glycolonitrile is below about 2:1, N,N'-bis-(cyanomethyl)piperazine compounds are produced along with N-(cyanomethyl)piperazine compounds. N,N'-bis(-cyanomethyl)piperazines are essentially insoluble in all solvents except dioxane. However, N,N'-bis(2-aminoethyl)piperazines have important uses as curing agents for epoxy resins and catalysts for urethane. Thus, where it is desired to produce these end products, the mole ratio of the piperazine compound:glycolonitrile or formaldehyde-hydrogen cyanide mixture must be within the range below about 2:1 to about 1:2. On the other hand, it is preferred that the mole ratio of piperazine compound:glycolonitrile or formaldehyde-hydrogen cyanide mixture be above about 2:1 to about 4:1 where it is desirable to produce N-(2-aminoethyl)piperazines. Experiments have shown that utilizing reactants within this mole ratio range produces negligible N,N'-bis(cyanomethyl)piperazines.

In the practice of the invention, the crude cyanomethylpiperazine reaction product can be used directly as the hydrogenation feed if desired. However, it is preferred to filter the reaction product prior to hydrogenation along with dilution adjustment with solvent to a preferred concentration of about 10% to 70% cyanomethylpiperazine. Filtration is especially desirable where glycolonitrile is employed as a reaction product so as to remove any precipitates, such as piperazine phosphates which are formed from the phosphoric acid stabilizer in the glycolonitrile solution. Salts of phosphoric acid may deleteriously affect the hydrogenation catalysts as well as cause mechanical problems because of plugging of valves and pumps.

A cyanomethylpiperazine compound, prepared as described hereinbefore, is then continuously hydrogenated in a continuous reactor by metering the compound, along with suitable amounts of solvent, ammonia diluent and hydrogen, over a pelleted cobalt-copper-chromium oxide hydrogenation catalyst which consists essentially of about 50–80% cobalt, about 10% to 49% copper and about 1% to 10% chromium, based upon the weight of the metals only, at a temperature within the range of about 80°C. to 150°C. and at a pressure within the range of about 1,000 psig to 10,000 psig. The specified catalyst does not have to be sintered or reduced in the presence of hydrogen at elevated temperatures prior to the hydrogenation step. We have found that the specific catalyst is extremely active and stable and produces very good yields of aminoethylpiperazines, e.g., within the range of about 88–100%, basis charged glycolonitrile.

An especially preferred catalyst is a pelleted catalyst of cobalt, copper and chromium oxides having approximately 75% cobalt, 22% copper and 3% chromium, based on the weight of metals only. Experiments have shown that the employment of such a catalyst produces very high yields of either N,N'-bis(2-aminoethyl)piperazines or N-(2-aminoethyl)piperazines, depending upon the cyanomethylpiperazine hydrogenation feed used.

The hydrogenation reaction is preferably carried out at a temperature within the range of about 80°C. to about 125°C. and a pressure within the range of about 1,000 psig to about 3,000 psig. These moderate temperature and pressure ranges do not degrade the sensitive cyanomethylpiperazines yet provide excellent high conversions. An optimum temperature range has been found to be about 90°C. to about 110°C. Moreover, it is preferred that the cyanomethylpiperazine hydrogenation feed be diluted in an inert solvent such as water, dioxane, methanol, or straight-chain alcohols inert to the hydrogenation reaction, to within the range of about 10% to 70% cyanomethylpiperazine, by weight. It is also beneficial to carry out the hydrogenation reaction in the presence of ammonia in a mole ratio of ammonia:cyanomethylpiperazine of between about 10:1 to about 20:1. Hydrogen is preferably fed to the hydrogenation reactor in excess over the stoichiometric amount required for hydrogenation of the nitrile group.

The particular space velocity of the hydrogenation reaction (grams cyanomethylpiperazine/hour/cc. catalyst) is not critical in the process. However, we prefer to conduct the hydrogenation reaction at a velocity of between about 0.5 to about 4 g. total liquid feed/-hour/cc. catalyst.

The aminoethylpiperazine compound can then be recovered from the hydrogenation reaction product by any technique known in the art, such as by distillation. Experiments have shown that recovery of an aminoethylpiperazine compound from the hydrogenation reaction effluent can easily be performed by known distillation techniques and the recovered compound is at least about 95% pure. Thus, recycle of the remaining effluent can be performed to reduce solvent and/or diluent costs.

This invention will be further illustrated by the following examples which are intended to be illustrative only and are not to be construed to place limitations on the scope of this invention.

EXAMPLE 1

A continuous hydrogenation reactor consisting of a stainless steel tube 1-¼ inches inside diameter by 27 inches in length was filled with 487 ml. of a pelleted catalyst of cobalt, copper and chromium oxides having approximately 75% cobalt, 22% copper and 3% chromium (based on the weight of the metals only). To the reactor and catalyst was metered a 75% hydrogen/25% nitrogen mixture (100 liters/hour, measured at 0°C. and 1 Atm.), ammonia (0.16 lbs./hr.) and a 15% solution of N-cyanomethylpiperazine in methanol solvent (0.39 lbs./hr.). The temperature was maintained at 90°C. and the pressure at 2,700 psig. The reactor effluent was distilled and N-(2-aminoethyl)piperazine was recovered in a yield of 91.5%, N-cyanomethylpiperazine fed to the reactor.

EXAMPLE 2

To the continuous hydrogenation reactor and catalyst of Example 1 was metered hydrogen (350 l./hr., measured at 0°C. and at 1 Atm.), ammonia (0.41 lbs./hr.) and a 33% solution of N,N'-bis(cyanomethyl)-2-methylpiperazine in dioxane (0.65 lbs./hr.). The hydrogenation reaction was performed while maintaining the temperature of the reactor between about 100°–120°C. and the pressure at 3,000 psig. The resulting reactor effluent was then distilled to give a 72.6% yield of N,N'-bis(2-aminoethyl)-2-methyl piperazine B.P. 119°–121°C. (2mm).

EXAMPLE 3

Piperazine and methanol solvent (60% piperazine by weight) was charged to a 3-liter reaction flask and glycolonitrile was added from an addition funnel at a rate sufficient to maintain the exothermic reaction temperature at 30°–45°C. Glycolonitrile was added until the mole ratio of piperazine:glycolonitrile attained approximately 2:1. The mixture was then digested, cooled, and filtered. The procedure was repeated for an additional twelve runs. The filtered product of each run was then metered, along with hydrogen and ammonia to the continuous hydrogenation reactor and catalyst described in Example 1 and hydrogenated under the conditions set forth in the following Table I.

The catalyst remained active during the entire series of hydrogenations and displayed no evidence of physical breakdown into "fines". Yields are set forth in Table I.

TABLE I

| Run No. | Temperature °C. | Space Velocity g./hr./cc cat. | Mole Ratio NH$_3$:CMP | CMP Conc. (%) Feed | AEP* Yield (%) |
|---|---|---|---|---|---|
| 1 | 90 | 0.55 | 20 | 15 | 93 |
| 2 | 100 | 0.55 | 20 | 15 | 94 |
| 3 | 110 | 0.55 | 20 | 15 | 89 |
| 4 | 120 | 0.55 | 20 | 15 | 93 |
| 5 | 100 | 0.55 | 20 | 15 | 94 |
| 6 | 90 | 0.55 | 20 | 15 | 95 |
| 7 | 100 | 0.55 | 10 | 30 | 94 |
| 8 | 110 | 0.55 | 10 | 30 | 88 |
| 9 | 120 | 0.55 | 10 | 30 | 79 |
| 10 | 120 | 1.0 | 10 | 30 | 58 |
| 11 | 130 | 1.0 | 10 | 30 | 65 |
| 12 | 140 | 1.0 | 10 | 30 | 69 |
| 13 | 150 | 1.0 | 10 | 30 | — |

*AEP = N-(2-aminoethyl)piperazine

As illustrated in Table I, the best yield of N-(2-aminoethyl)piperazine was obtained in Run No. 6 at 90°C. (95% basis analysis). Satisfactory results were obtained at both 10:1 and 20:1 mole ratios of ammonia:cyanomethylpiperazine. The concentration of cyanomethylpiperazine (15 to about 30%) had little effect, if any, on resulting yield of N-(2-aminoethyl)piperazine.

From the foregoing description and Examples of this invention, those of ordinary skill in the art may make many modifications and variations therefrom without departing from the scope of the invention as hereinafter claimed.

We claim:

1. A direct continuous process for preparing a 2-aminoethylpiperazine compound from a cyanomethylpiperazine compound of the formula:

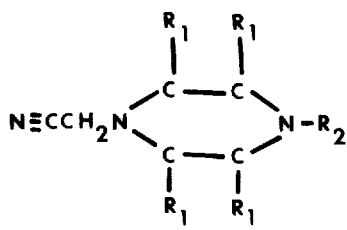

wherein R$_1$ is selected from a group consisting of hydrogen, alkyl of from 1–12 carbon atoms, and phenyl, and R$_2$ is selected from a group consisting of hydrogen and cyanomethyl comprising the steps of:

continuously hydrogenating said cyanomethylpiperazine compound in the presence of a pelleted hydrogenation catalyst consisting essentially of cobalt, copper and chromium metal oxides having about 50% to 80% cobalt, about 10% to 49% copper, and about 1% to 10% chromium, based on the total weight of said metals, at a temperature within the range of about 80°C to about 150°C and a pressure within the range of about 1,000 psig to 10,000 psig; and, recovering the 2-aminoethylpiperazine from the resulting reaction product.

2. The process in accordance with claim 1 wherein the cyanomethylpiperazine is hydrogenated in the presence of ammonia in an ammonia:cyanomethylpiperazine mole ratio of between about 10:1 to about 20:1.

3. The process in accordance with claim 1 wherein the cyanomethylpiperazine is in solution, said solution containing about 10% to about 70% of said cyanomethylpiperazine by weight.

4. The process in accordance with claim 1 wherein said cyanomethylpiperazine compound is continuously hydrogenated in the presence of said catalyst at a temperature within the range of about 80°C. to about 125°C. at a pressure within the range of about 1,000 psig to about 3,000 psig.

5. The process in accordance with claim 1 wherein said pelleted hydrogenation catalyst consists essentially of about 75% cobalt, 22% copper and 3% chromium, based upon the total weight of the metals.

6. The process in accordance with claim 5 wherein said cyanomethylpiperazine compound is hydrogenated in the presence of said catalyst at a temperature within the range of about 90°C. to about 110°C. at a pressure within the range of about 1,000 psig to about 3,000 psig.

* * * * *